United States Patent [19]
Mirth et al.

[11] Patent Number: 5,928,402
[45] Date of Patent: Jul. 27, 1999

[54] MULTI-SCREEN SYSTEM FOR MIXING GLASS FLOW IN A GLASS BUSHING

[75] Inventors: David R. Mirth, Canal Winchester; Irvin J. Bence, Westerville, both of Ohio

[73] Assignee: Owens Corning Fiberglas Technology, Inc., Summit, Ill.

[21] Appl. No.: 08/905,496

[22] Filed: Aug. 4, 1997

[51] Int. Cl.$^6$ .................................................. C03B 5/00
[52] U.S. Cl. .................. 65/495; 65/134.1; 65/135.1; 65/135.2; 65/346; 65/502; 65/533
[58] Field of Search ............... 65/134.1, 135.1, 65/135.2, 346, 495, 502, 533

[56] References Cited

U.S. PATENT DOCUMENTS

| | | |
|---|---|---|
| 1,986,575 | 1/1935 | Honiss ................................. 65/135.1 |
| 2,360,373 | 10/1944 | Tiede ..................................... 65/495 |
| 2,460,547 | 2/1949 | Stevens ................................. 65/495 |
| 2,482,299 | 9/1949 | Stevens ................................. 65/495 |
| 3,401,536 | 9/1968 | Glaser . |
| 3,556,753 | 1/1971 | Glaser . |
| 3,810,741 | 5/1974 | Stalego . |
| 3,988,135 | 10/1976 | Coggin, Jr. . |
| 4,264,348 | 4/1981 | Sullivan . |
| 4,436,541 | 3/1984 | Pellegrin et al. . |
| 4,537,609 | 8/1985 | McEathron . |
| 4,559,072 | 12/1985 | Harcuba ............................... 65/135.2 |
| 4,612,027 | 9/1986 | Marra ..................................... 65/495 |

FOREIGN PATENT DOCUMENTS

| | | | |
|---|---|---|---|
| 632507 | 12/1961 | Canada ................................. 65/495 |
| 562518 | 6/1977 | U.S.S.R. ............................... 65/495 |
| 610808 | 6/1978 | U.S.S.R. ............................... 65/495 |
| 998399 | 2/1983 | U.S.S.R. ............................... 65/495 |
| 1710528 | 2/1992 | U.S.S.R. ............................... 65/495 |

*Primary Examiner*—Peter Chin
*Assistant Examiner*—Michael P. Colaianni
*Attorney, Agent, or Firm*—Inger H. Eckert

[57] ABSTRACT

A multi-screen mixing apparatus for installation in a fiber-forming bushing used in the manufacture of glass fibers. The multi-screen mixer attaches to the walls of the bushing, and includes a first screen having openings therein through which the glass flows and a second screen having openings through which the glass flows longitudinally spaced from the openings in the first screen such that the molten glass must flow in a non-linear path as it passes through the screens. Additional screens can be added to cause additional flow diversion to further mix the molten glass.

18 Claims, 6 Drawing Sheets

MULTI-SCREEN SYSTEM FOR MIXING GLASS FLOW IN A GLASS BUSHING

TECHNICAL FIELD AND INDUSTRIAL APPLICABILITY OF THE INVENTION

This invention relates generally to the use of a device for mixing glass flow in a fiber-forming bushing for the manufacture of glass fibers. More specifically, the invention is directed to a multi-screen mixing system for placement in the bushing to ensure that the glass will be isothermal as it reaches the tip plate from which the fibers are pulled. The invention advantageously results in improved yardage control during the forming process.

BACKGROUND OF THE INVENTION

In the production of glass fibers, a melter is frequently used wherein glass cullet is added at the top thereof and heated to melting temperature to form molten glass. The molten glass moves downward within the melter and then flows into the bushing. The molten glass exits the bushing through a tip plate in the form of glass fibers or filaments. The tip plate is an apparatus having a plurality of very small orifices or tips through which a plurality of glass fibers, still in molten condition, are pulled. Thereafter, the fibers are typically heat quenched and attenuated, coated with a sizing composition, and then gathered or wound onto a spool for later use.

In another apparatus commonly used to produce glass fibers, the glass cullet or batch is melted in a large furnace and the resulting molten glass flows through channels, to forehearths. The forehearths have holes in the bottom thereof through which the molten glass will flow. Beneath each hole is a flow block, a bushing block, a bushing, and a tip plate through which the molten glass is drawn to form glass fibers or filaments. The resulting fibers are then processed in the manner discussed above.

As the market for glass fibers has increased, larger volume equipment for fiber production has been developed. In modern glass fiber production facilities, it is not uncommon to attempt to pull up to, or even in excess of, 1800 glass fibers simultaneously through a single bushing. However, increasing the size of the bushing tip plates to accommodate more fibers has led to unforeseen problems. For example, to obtain proper attenuation of the glass fibers, it is imperative that they be of substantially equal temperatures as they are pulled from the bushing tip plate. Accordingly, it is important that the layer of molten glass directly above the tip plate be at a substantially uniform temperature.

However, bushings, by their very nature, tend to have varying temperature zones across their surface. Generally, the center of the bushing is hotter, as much as 100° F. for example, than the outer regions, such as along the walls of the bushing. Additionally, such temperature differentials often increase as the size of the tip plate increases. Accordingly, obtaining a substantially uniform glass temperature across the bushing tip plate to obtain good fiber attenuation becomes much more difficult as the size of the tip plate increases.

Also, yardage (output) control is reduced if the fibers are of different temperatures as they are pulled from the tip plate. The fibers across the tip plate are pulled therefrom at a uniform rate. However, if the temperature of the molten glass across the tip plate varies, even as little as 100° F. the pulling speed may be too fast for fibers emerging from cooler regions, causing breakage. On the other hand, fibers emerging from hotter regions may sag if the pulling speed is too slow. Thus, the existence of temperature differentials across the tip plate significantly complicates yardage (output) control of the fibers being pulled. Further, because of the breakage noted above, the number of glass fibers being pulled from a given tip plate is often not maximized.

Various production techniques have been used in attempts to equalize the molten glass temperature at the tip plate. For example, it is known to heat the tip plate by passing an electric current therethrough. However, this adds heat to all the molten glass on the tip plate. Thus, the molten glass regions initially hotter than other regions across the tip plate typically remain relatively hotter than the other, cooler regions, since both hotter and cooler regions are heated simultaneously.

Also, it is known to heat the glass in the bushing block. However, this has not proved to be entirely satisfactory as the glass flowing along the walls of the bushing block is heated more than the glass in the center of the flow passage. Thus, although the resultant additional heating is not evenly distributed throughout the molten glass mass, it typically does not totally eliminate the uneven heating pattern therein.

Further, bushing blocks with multiple flow passages, as disclosed in U.S. Pat. No. 4,264,348, have been used to enhance mixing of the glass as it flows through the bushing block. However, even this measure has not been fully capable of effectively delivering a mass of molten glass to a tip plate at a substantially uniform temperature thereacross. Accordingly, a need for a simple, but effective means for homogenizing the glass temperature across the bushing has remained.

SUMMARY OF THE INVENTION

In response to this need, the present invention provides an apparatus that mixes the molten glass directly upstream of the tip plate to ensure that the glass is at a substantially uniform temperature across the tip plate prior to being formed into fibers. The apparatus forces the molten glass to flow in a non-linear path from one region of the bushing to another region, and back (for example, from a central or interior region to a second region, such as along the exterior walls of the bushing, and back), as it flows downward through the bushing to mix the glass prior to the flow reaching the tip plate. This is accomplished by providing a plurality of screens to divert and mix the glass flow in the bushing directly above the tip plate. The screens are constructed such that they force the downwardly flowing glass to flow first to one region of the bushing and then to another, and so on, depending upon the actual number of screens utilized.

DETAILED DESCRIPTION AND PREFERRED EMBODIMENTS OF THE INVENTION

In the manufacture of glass fibers, it is important that the individual fibers be at substantially equal temperatures as they are pulled from the bushing tip plate. Tip plates vary in size with typical widths ranging from about 1 to about 36 inches and lengths ranging from about 4 to about 48 inches. As a practical matter, bushing tip plates are usually about 3 inches wide and about 15 inches in length. In such an example, a mass of molten glass of about 45 square inches must be maintained at an equal temperature as it reaches the top of the tip plate.

Figure 1:
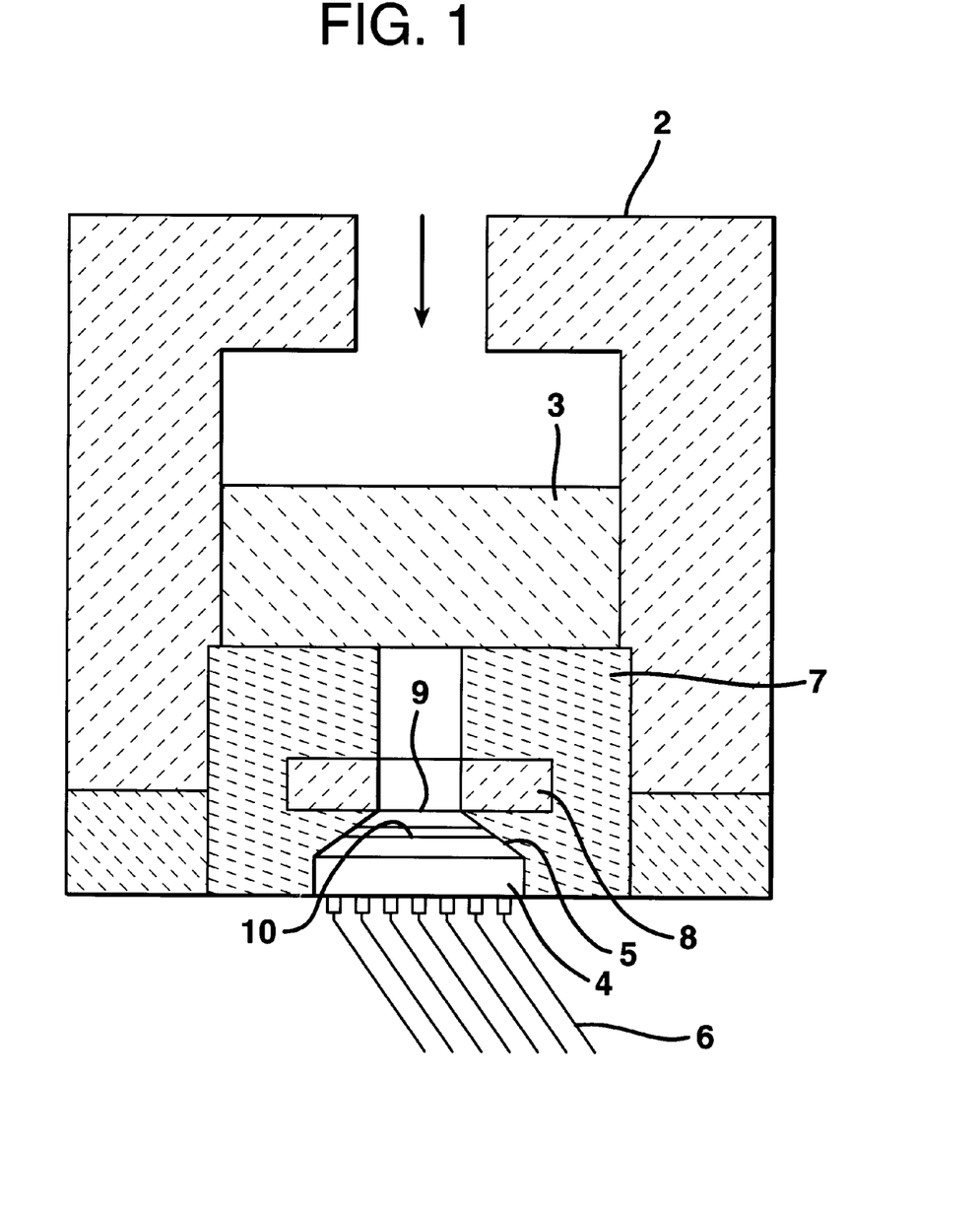
FIG. 1 is a cross-section of an apparatus for making glass fibers.

FIG. 1 illustrates a glass fiber manufacturing apparatus which includes a forehearth 2 to which molten glass 3 flows to be discharged at tip plate 4 of bushing 5 as molten glass fibers 6. Between the forehearth and the bushing, the molten glass flows through flow block 7 and bushing block 8 which direct the molten glass from the furnace or forehearth to the inlet 9 of the bushing 5. Below the bushing inlet 9 and within the bushing 5 is a multi-screen mixing apparatus shown generally at 10.

The mixing apparatus 10, as outlined above, serves to mix the mass of molten glass whereby it enters the tip plate 4 region of the bushing, directly below the mixer 10, at a substantially uniform or isothermal temperature throughout its mass. To this end, the mixer 10 of this invention comprises at least two screens or plates placed one above and spaced from the other. The lower-most screen is preferably spaced at least about 0.5 inch above tip plate 4 to allow the molten glass to flow completely across the tip plate. Additionally, the screens are preferably spaced apart from one another, and from the bottom of the bushing block, a sufficient distance to ensure an adequate flow of the molten glass across the screen. The screens have specifically located openings, as described in detail below, through which the entire mass of molten glass must move as it flows downwardly through the bushing. By orienting the screens such that the openings there are in different locations relative to the bushings' central axis, the entire mass of molten glass is forced to flow in a non-linear path which mixes the glass and homogenizes the temperature throughout as it traverses vertically through the bushing.

The screens are sized based upon the internal dimensions of the bushing, and since the bushing may have a varying cross-section along its height as shown in FIG. 1, the screens may have different dimensions. To obtain good mixing, at least two screens are preferably used in tandem. In a preferred 2 screen embodiment, the screens can generally be described as an outflow screen, and an inflow screen. The outflow screen forces the glass flow to the ends or wall area of the bushing where flow holes or openings are provided. The inflow screen forces the glass flow to the center of the bushing where flow holes or openings are provided.

The flow holes or openings can be of any cross-sectional geometry. Generally, the openings will be circular, square, or rectangular. The openings can range from a plurality of openings of from about 0.001 square inch, up to a full opening across the width of the screen equal to about 50% of the screen area. However, from about 6 to 18 holes of from about 0.25 to 0.5 inches is often sufficient. Obviously, the total area of the opening in the screen for glass to flow through will depend on the desired flow rate. It cannot be so large, however, that it does not create the desired flow disturbance. The middle of the outflow screen, and the ends of the inflow screen, are preferably solid except for a small number of holes ranging from about 0.02–0.04 inch in diameter for venting purposes. Preferably, the solid portions of each screen comprises 50% or more of each screen's surface area.

Figure 6:
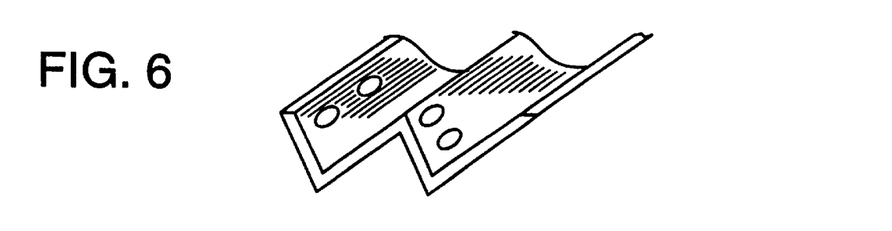
FIG. 6 is a cross-section of an additional embodiment of the screen geometry.
Figure 7:
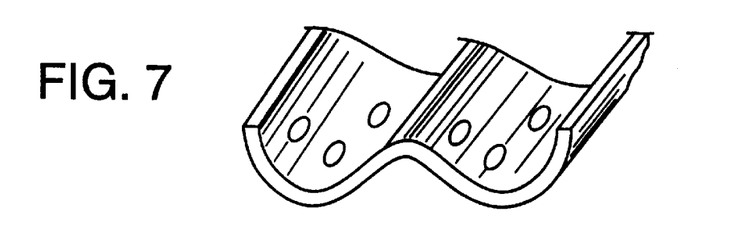
FIG. 7 is a cross-section of a further embodiment of the screen geometry.

The screens may be flat, V-shaped, W-shaped (see FIG. 6), rippled (see FIG. 7), or any other geometry across the width of the bushing 5. Similarly, while not illustrated, the geometry of the screens across the length of the bushing may also be advantageously designed to aid in the flow of the glass from one region of the bushing to another. The screen thickness preferably ranges from about 0.01 to about 0.1 inch.

Figure 8:
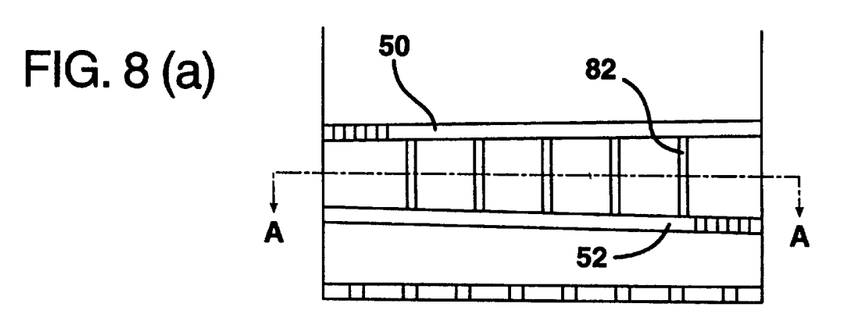
FIG. 8a is a front cross-section view of a fiber-forming bushing equipped with a further embodiment of the invention.
FIG. 8b is a top view of the fiber-forming bushing of FIG. 8a taken along line A—A.

As noted above, there are preferably at least two screens. Also, as shown in FIGS. 8a and 8b, flow partitions 82, described in greater detail later herein, may be added between the screens to induce further mixing of the glass as it flows across the screens. The flow partitions may also be used to provide structural support for the screens as they extend vertically therebetween.

While inflow and outflow screens have been described as being used as a pair, it is within the realm of this invention to utilize two outflow screens as a pair. In this case, the screens would have openings only at one end and would be oriented relative to each other with an opening at the opposite ends thereof. Further, three or more screens may be utilized as long as the inflow/outflow screens are alternately stacked, or outflow screens are oriented as noted above. However, while additional screens result in greater mixing, they may reduce the glass flow rate and increase the screen cost.

The screens are preferably sized to the bushing so that at least the longitudinal edges engage the bushing walls. Generally, bushings measure from about 1 to about 36 inches in width and from about 4 to about 48 inches in length, and the screens are sized accordingly. The edges of the screens may be turned upwardly or downwardly to add rigidity to the screen and to aid in attaching the screen to the bushing walls. As illustrated in FIG. 1, the upper screen may be smaller than the screen or screens therebelow depending upon the internal shape of the bushing. Additionally, although the minimum spacing between the screens, and between the bottom screen and the tip plate, are controlled by glass flow considerations, the maximum spacing is largely a function of the height of the bushing. For a bushing of typical height, about 1.5 inches, measured from the top of the tip plate to the bottom of the bushing block, the top screen is preferably about 1 inch above the tip plate with the second screen midway therebetween. Taller bushings will allow for greater spacing or additional screens.

The screens, as well as the bushing, are preferably made of a material that is resistant to corrosion by molten glass. For example, for molten glass temperatures of about 2000° F. and above, platinum-rhodium or platinum-gold-rhodium alloys are suitable. Preferably, the screens are welded to the bushing walls, but other attachment systems, such as bolts, may also be used.

Figure 2:
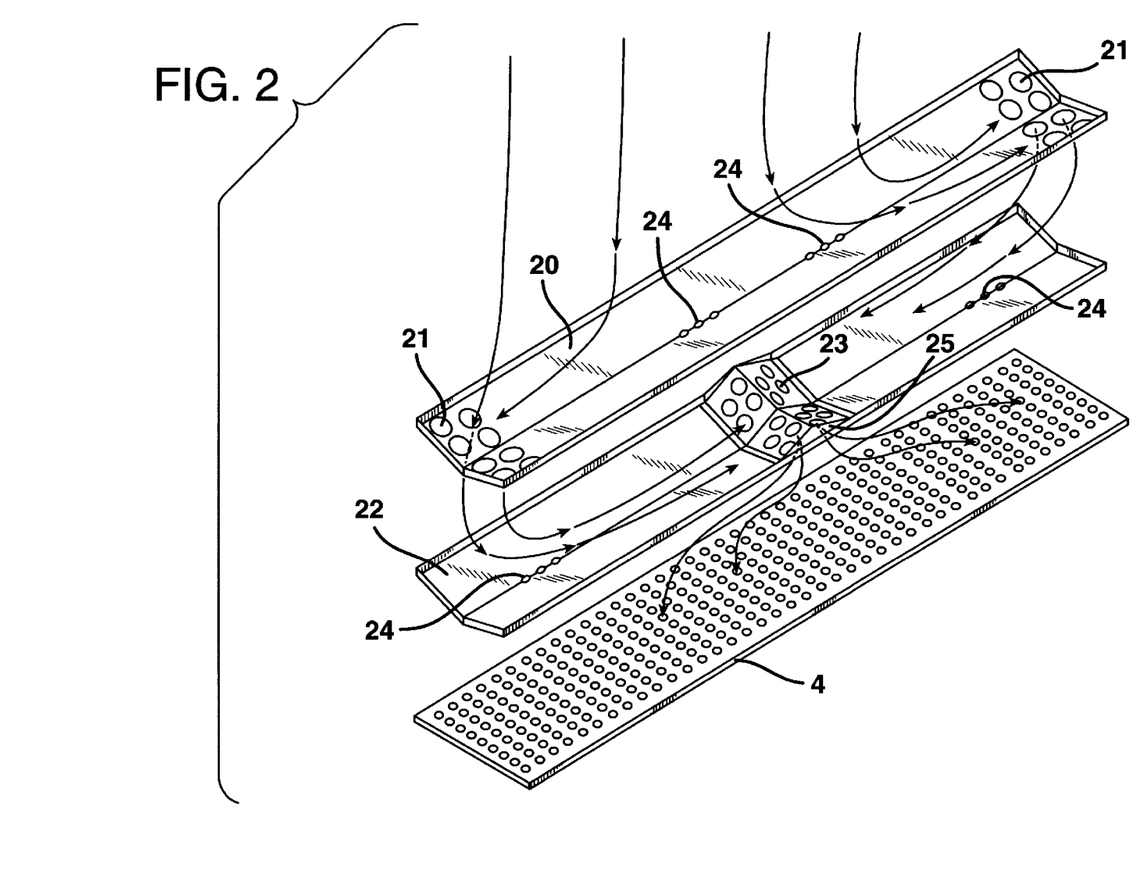
FIG. 2 is an exploded, oblique view of a first embodiment of the invention.

A preferred embodiment of the present invention is illustrated in FIG. 2 in position above tip plate 4. This embodiment includes an outflow upper screen 20 having holes or openings 21 provided at the ends thereof, and an inflow lower screen 22 having holes or openings 23 located approximately at the center thereof. The solid portion of each of the screens encompasses at least 50% or more of the screen area. However, the solid portions of each screen may have a series of small vent holes 24 that are large enough to allow air or gases to move upwardly in the bushing so as not to impede the glass flow, but not so large as to permit a significant amount (preferably less than about 10% of total flow) of molten glass to flow therethrough.

The embodiment of FIG. 2 includes in the lower screen a slightly raised center portion 25 where holes 23 are located. The raised center portion 25 serves to space the upper screen from the lower screen. As seen from the arrows, the glass flows across the upper screen to either end, through holes 21 onto the lower screen 22. The molten glass then flows from the outer edges of the lower screen 22 to the center area and through holes 23 to the top of the tip plate 4.

The mixing screens 20 and 22 are shown to be slightly V-shaped across their width. While not required, the V-shape is provided to strengthen the screens as the ridge formed therein serves to add rigidity. Other shapes, as noted above, may also be used. Also, the outer edges of the screens may be turned up or down to add further rigidity to the screens. The outer edges of the screens are in contact with the interior of the bushing such that the glass must flow through holes 21 and 23. Preferably, the screens are attached to the walls of the bushing, such as by welding.

Figure 3:
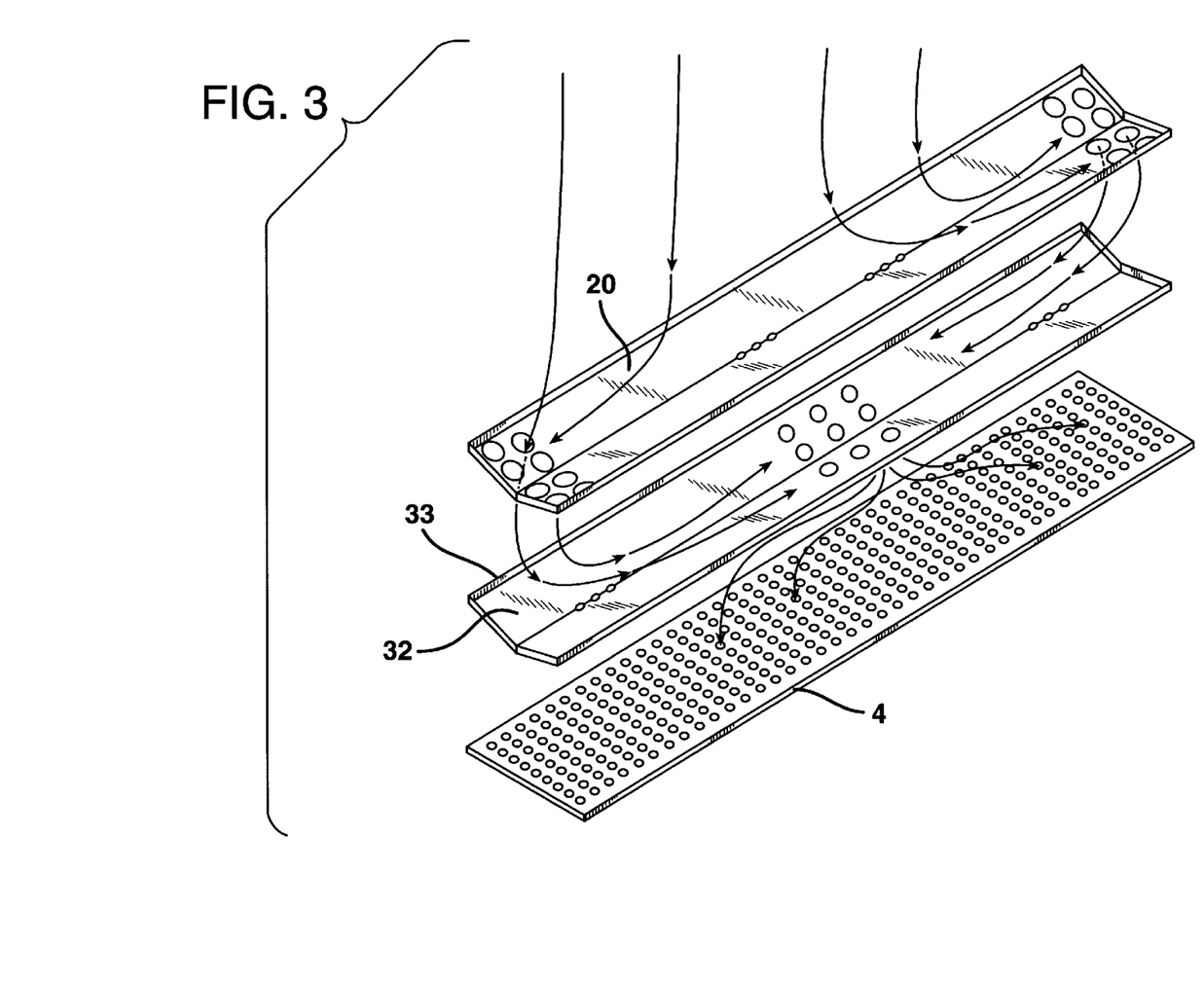
FIG. 3 is an exploded, oblique view of a second embodiment of the invention.

The embodiment of FIG. 3 differs from the previous embodiment in that the lower screen 32 is without the raised center portion as described above. The raised outer edges 33 serve to space the upper and lower screens from each other. Attachment of the screens to the interior walls of the bushing also serves to maintain the spacing between the screens.

Figure 4:
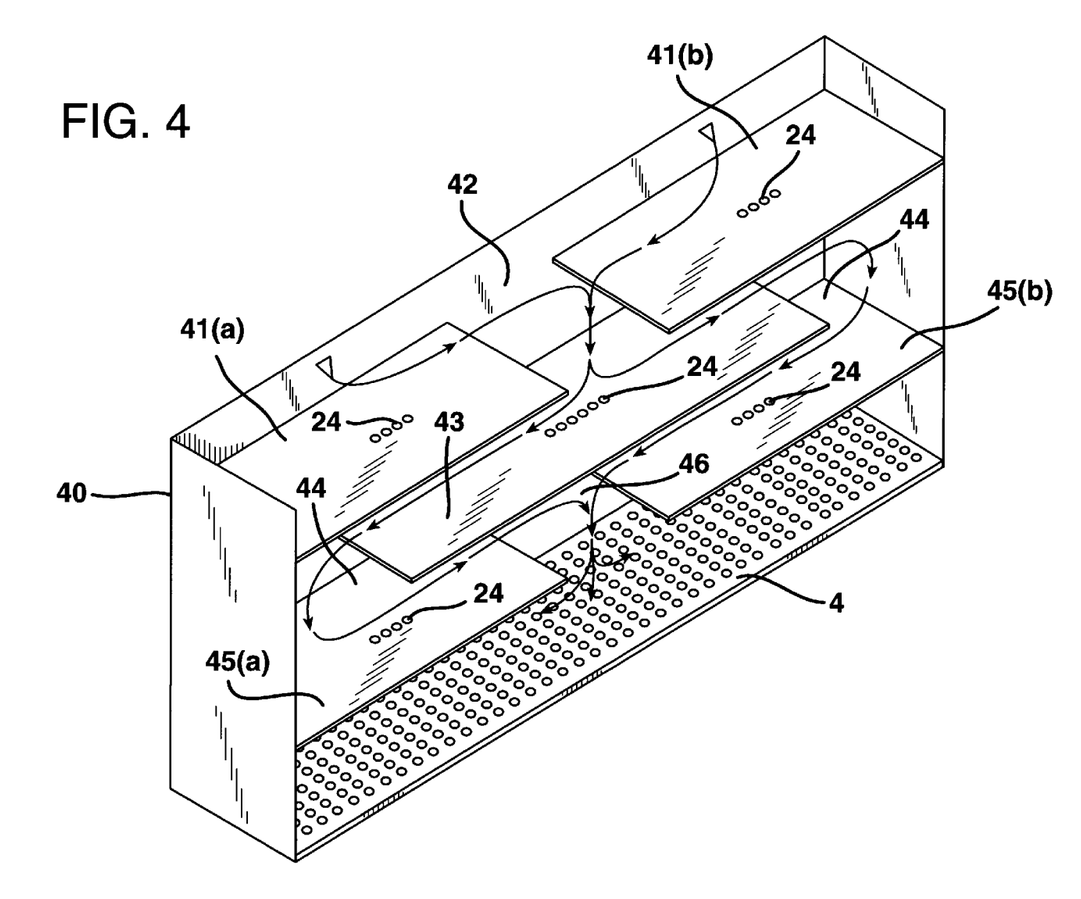
FIG. 4 is an oblique view of a longitudinal cross-section of a fiber-forming bushing equipped with a third embodiment of the invention.

FIG. 4 shows a longitudinal cross section of a fiber-forming bushing 40 containing three mixing screens, mounted therein above tip plate 4. As shown by the arrows, the glass flow enters the bushing and flows to the center of the top screen formed of screen sections 41(a) and 41(b), where it passes through the opening 42 provided thereby, and onto center screen 43. The molten glass then flows to either end of the center screen 43, where it passes through the openings 44 provided thereby, and onto the bottom screen formed of screen sections 45(a) and 45(b). The glass then flows along the bottom screen to the center thereof, through opening 46 provided thereby, and onto tip plate 4.

While the screens are herein shown as flat plates with open gaps 42, 44 and 46 at the center or outer edges, it is to be understood that they may also be continuous plates with holes formed therein as shown in FIGS. 2 and 3. Further, the screens may be V-shaped or other non-flat shape as discussed above.

Figure 5:
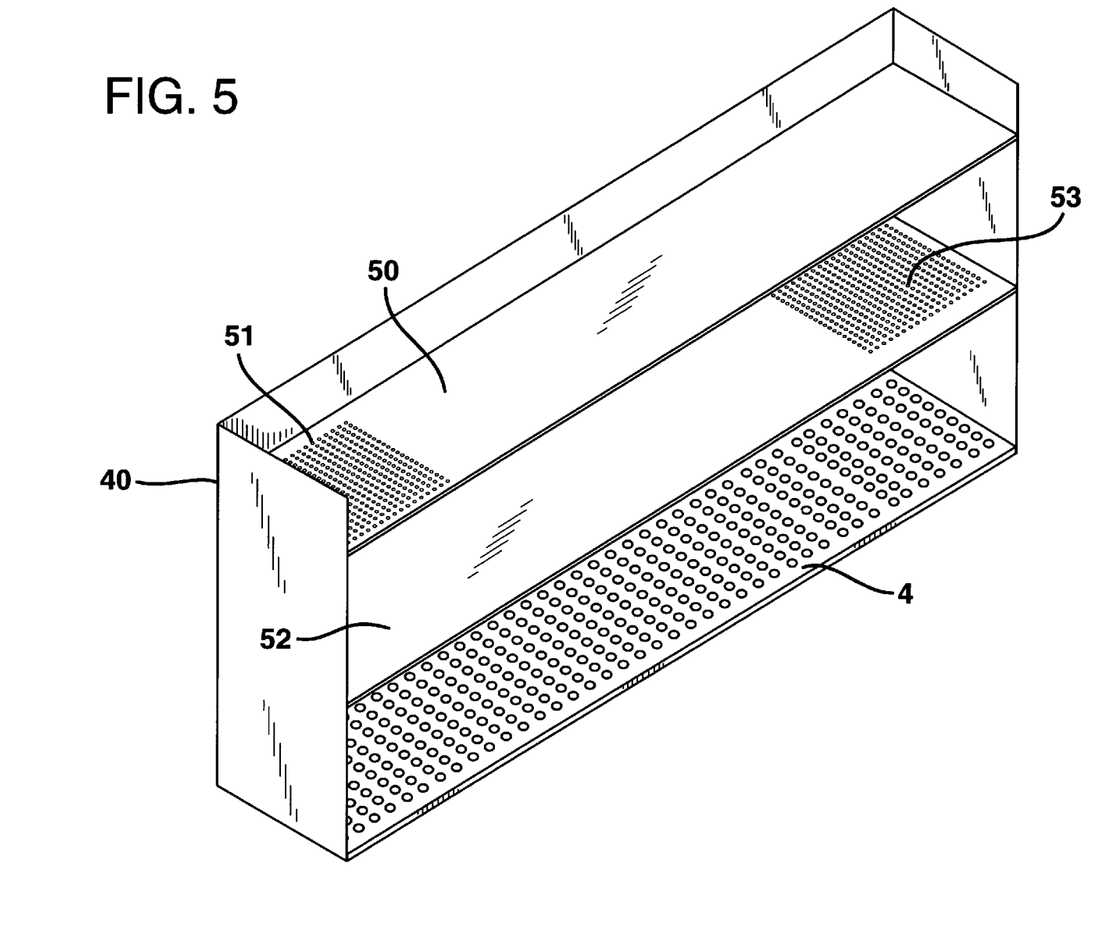
FIG. 5 is an oblique view of a longitudinal cross-section of a fiber-forming bushing equipped with a fourth embodiment of the invention.

FIG. 5 illustrates a longitudinal cross-section of a fiber-forming bushing 40 containing a further embodiment of the invention wherein each of the upper and lower screens 50 and 52, respectively, have flow holes in only one end thereof. These screens are each outflow screens as discussed above. Thus, all of the molten glass must flow along the upper screen to one end of the bushing, through holes 51 in upper screen 50, and then across lower screen 52 to the holes 53 at the opposite end of the bushing before arriving at the tip plate 4. In this embodiment, the hole pattern in the screens is shown to be a larger plurality of smaller holes than shown in FIGS. 2–4, discussed above. For example, 400 holes, 0.06 inches in diameter, may be provided. However, it is within the scope of this invention that a lesser number of larger holes, a greater number of smaller holes, or open gaps as in FIG. 4, may also be used in this embodiment. In addition, screens 50 and 52 may be V-shaped and have raised outer edges as discussed above, and are preferably mounted within the bushing at a slight angle from horizontal (see FIG. 8(a)) to facilitate flow of the molten glass to the end of the screens having the flow openings.

As shown in FIGS. 8a and 8b, spaced flow partitions 82 may be added between the screens, for instance, 50 and 52 in FIG. 5, so the glass mixes further as it flows across the surface of the lower screen. Flow partitions 82 preferably span the entire vertical distance between adjacent screens and are attached thereto, as shown in FIG. 8(a), to provide structural support for the screens. Additionally, the flow partitions must either have flow openings formed therein, or span less than the entire width of the screen, to allow the glass to traverse the length of the screen. However, to achieve increased mixing of the glass, the flow openings in the partitions should be in different locations in adjacent partitions to force the glass to flow in a non-linear path across the screen. In a preferred embodiment, the flow partitions span less than the entire width of the screen, and are mounted in the bushing such that adjacent partitions abut opposite sides of the bushing as illustrated in FIG. 8(b). By such arrangement of the partitions, the glass is forced to flow in a serpentine path as it traverses the lower screen 52 which imparts further mixing of the glass.

The non-linear path that the molten glass flow must take to traverse a fiber-forming bushing containing the mixing screens of the invention results in an even heat distribution throughout the molten glass. As a result, the entire mass of molten glass enters onto the top of the tip plate at substantially the same temperature.

What is claimed is:

1. A multi-screen apparatus for mixing molten glass flow in a glass fiber-forming bushing prior to passage through a tip plate, said apparatus comprising:
    at least two screens attached to said bushing above said tip plate and spaced from each other,
        a first of said screens providing at least one first screen opening through which molten glass may flow, and
        a second of said screens arranged below said first screen, said second screen providing at least one second screen opening through which said molten glass may flow,
    wherein the molten glass flows along said first seen in a longitudinal direction perpendicular to a central ads of said bushing in a first direction toward said at least one first screen opening, and wherein the molten glass flows along said second screen in the longitudinal direction perpendicular to the central axis of said bushing in a second direction toward said at least one second screen opening, thereby mixing the molten glass for improved uniformity in the temperature of the molten glass.

2. The apparatus of claim 1, wherein the total area of said first screen opening comprises up to about 50% of the surface area of said first screen and the total area of said second screen opening comprises up to about 50% of the surface area of said second screen.

3. The apparatus of claim 1, wherein said first screen provides at least one first screen opening adjacent to each end thereof, and said at least one second screen opening is near the center thereof.

4. The apparatus of claim 3, wherein said first screen opening is a plurality of first screen holes and said second screen opening is a plurality of second screen holes.

5. The apparatus of claim 4, wherein said first screen has a V-shaped cross-section and said second screen has a V-shaped cross-section.

6. The apparatus of claim 5, wherein each of said first screen holes and each of said second screen holes have a diameter of from about 0.25 inch to about 0.50 inch.

7. The apparatus of claim 6, wherein said plurality of first screen holes ranges in number from about 6 to about 18 and said plurality of second screen holes ranges in number from about 6 to about 18.

8. The apparatus of claim 1, wherein said first screen opening is near one end thereof, and said second screen opening is near an opposite end thereof.

9. The apparatus of claim 8, wherein said first screen opening is a plurality of first screen holes and said second screen opening is a plurality of second screen holes.

10. The apparatus of claim 9, wherein said first screen has a V-shaped cross-section and said second screen has a V-shaped cross-section.

11. The apparatus of claim 10, wherein each of said first screen holes and each of said second screen holes have a diameter of from about 0.25 inch to about 0.50 inch.

12. The apparatus of claim 11, wherein said plurality of first screen holes ranges in number from about 6 to about 18 and said plurality of second screen holes ranges in number from about 6 to about 18.

13. The apparatus of claim 1, further including spaced partitions between said first screen and said second screen.

14. The apparatus of claim 13, wherein said partitions provide partition openings positioned in different locations relative to said second screen's longitudinal axis, whereby a non-linear flow path is formed.

15. The apparatus of claim 14, wherein said partitions span less than the entire width of said second screen and adjacent partitions abut opposite sides of said bushing, whereby a serpentine flow path is formed.

16. The apparatus of claim 3, further comprising a third screen spaced from said first screen and said second screen said third screen having at least one third screen opening laterally spaced from said second screen opening.

17. The apparatus of claim 8, further comprising a third screen spaced from said first screen and said second screen said third screen having at least one third screen opening laterally spaced from said second screen opening.

18. The apparatus of claim 1, wherein the first direction of flow of the molten glass is in an opposite direction to the second direction of flow of the molten glass.

* * * * *